US007488087B2

(12) United States Patent  
Cernasov

(10) Patent No.: US 7,488,087 B2
(45) Date of Patent: Feb. 10, 2009

(54) LIGHT GUIDE AND DISPLAY INCLUDING A LIGHT GUIDE

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 74 days.

(21) Appl. No.: 11/436,639

(22) Filed: May 19, 2006

(65) Prior Publication Data

US 2007/0268691 A1 Nov. 22, 2007

(51) Int. Cl.
*F21V 9/00* (2006.01)
(52) U.S. Cl. .................. 362/231; 362/555; 362/561
(58) Field of Classification Search .................. 362/29, 362/555, 560, 561, 231, 320
See application file for complete search history.

(56) References Cited

U.S. PATENT DOCUMENTS

| 5,195,162 | A | * | 3/1993 | Sultan et al. ................. 385/130 |
|---|---|---|---|---|
| 5,499,120 | A | | 3/1996 | Hansen |
| 5,815,228 | A | | 9/1998 | Flynn |
| 5,883,684 | A | | 3/1999 | Millikan |
| 5,965,907 | A | | 10/1999 | Huang et al. |
| 6,322,225 | B1 | | 11/2001 | Koike |
| 6,469,453 | B2 | | 10/2002 | Tajika et al. |
| 6,521,879 | B1 | | 2/2003 | Rand |
| 6,540,664 | B1 | | 4/2003 | Blair |
| 6,608,614 | B1 | | 8/2003 | Johnson |
| 6,655,810 | B2 | | 12/2003 | Hayashi et al. |
| 6,655,825 | B2 | * | 12/2003 | Muthu et al. ................. 362/561 |
| 6,661,181 | B2 | | 12/2003 | Shin |
| 6,672,734 | B2 | | 1/2004 | Lammers |
| 6,697,130 | B2 | | 2/2004 | Weindorf |
| 6,778,234 | B2 | | 8/2004 | Park et al. |
| 6,854,854 | B2 | | 2/2005 | Hoelen et al. |
| 6,885,360 | B2 | | 4/2005 | Hara et al. |
| 7,168,841 | B2 | * | 1/2007 | Hsieh et al. .................. 362/613 |
| 2002/0015297 | A1 | | 2/2002 | Hayashi et al. |
| 2002/0047556 | A1 | | 4/2002 | Tajika et al. |
| 2002/0071288 | A1 | | 6/2002 | Lim |
| 2002/0130628 | A1 | | 9/2002 | Shin |
| 2002/0130786 | A1 | | 9/2002 | Weindorf |
| 2002/0130985 | A1 | | 9/2002 | Weindorf |
| 2002/0135997 | A1 | | 9/2002 | Lammers |
| 2002/0159002 | A1 | | 10/2002 | Chang |
| 2002/0163791 | A1 | | 11/2002 | Hoelen et al. |
| 2002/0191397 | A1 | | 12/2002 | Loga et al. |
| 2002/0196220 | A1 | | 12/2002 | Sato et al. |
| 2003/0043107 | A1 | | 3/2003 | Ruby et al. |
| 2003/0067436 | A1 | | 4/2003 | Hara et al. |
| 2003/0122771 | A1 | | 7/2003 | Sumiyoshi |
| 2003/0206256 | A1 | | 11/2003 | Drain et al. |
| 2004/0041780 | A1 | | 3/2004 | Ko |
| 2004/0042234 | A1 | | 3/2004 | Otake |
| 2004/0061810 | A1 | | 4/2004 | Lowery et al. |
| 2004/0061814 | A1 | | 4/2004 | Kim et al. |
| 2004/0070966 | A1 | | 4/2004 | Ahn et al. |
| 2004/0109306 | A1 | | 6/2004 | Lee |

(Continued)

*Primary Examiner*—John A Ward
(74) *Attorney, Agent, or Firm*—Ingrassia Fisher & Lorenz, P.C.

(57) ABSTRACT

A display comprises a backlight comprising different colored light sources, a transmissive display panel positioned adjacent to the backlight, and a light guide positioned between the backlight and the transmissive display. The light guide directs light from the different colored light sources onto the transmissive display to create an alternating array of colors.

21 Claims, 6 Drawing Sheets

U.S. PATENT DOCUMENTS

| | | |
|---|---|---|
| 2004/0170012 A1 | 9/2004 | Huang et al. |
| 2004/0196667 A1* | 10/2004 | Lea ............................ 362/583 |
| 2004/0246403 A1 | 12/2004 | Kim et al. |
| 2004/0246696 A1 | 12/2004 | Yoo |
| 2004/0263718 A1 | 12/2004 | Tsai |
| 2005/0001537 A1 | 1/2005 | West et al. |
| 2005/0001952 A1 | 1/2005 | Han et al. |
| 2005/0002176 A1 | 1/2005 | Cha et al. |
| 2005/0007517 A1 | 1/2005 | Anandan |
| 2005/0046766 A1 | 3/2005 | Ide |
| 2005/0083712 A1 | 4/2005 | Jeon |
| 2005/0094391 A1 | 5/2005 | Campbell |
| 2005/0116921 A1 | 6/2005 | Kim |
| 2005/0122707 A1* | 6/2005 | Kim ............................ 362/29 |
| 2005/0157494 A1 | 7/2005 | Chou et al. |
| 2005/0157518 A1 | 7/2005 | Kazuhiro et al. |
| 2005/0157521 A1 | 7/2005 | Chen et al. |

* cited by examiner

US 7,488,087 B2

LIGHT GUIDE AND DISPLAY INCLUDING A LIGHT GUIDE

FIELD

Embodiments generally relate to methods and apparatus of displaying video.

BACKGROUND

Typically liquid crystal displays (LCDs) display images by varying the amount of light that passes through liquid crystal cells of the liquid crystal panel. FIG. 1 is a diagram illustrating a conventional LCD 100. LCD 100 includes a liquid crystal layer 102, which is the "active layer" in the LCD. Liquid crystal layer 102 determines the amount of light which passes through by rotating the polarization of the light passing though the layer. Liquid crystal layer 102 rotates the polarization of the incoming light by applying a local voltage to different cells within liquid crystal layer 102.

Liquid crystal layer 102 is placed between two polarizing filters 104 and 106 that have a 90 degree rotation in their polarization axis. When placed between polarizing filters 104 and 106, liquid crystal layer 102 determines the amount of light passing through by rotating the polarization of the light to be aligned or misaligned with the polarization axis of filter 106. Since each cell of liquid crystal layer 102 may be controlled individually, each cell of liquid crystal layer 102 behaves as a voltage controlled valve letting though more or less of the incoming light, depending on the voltage applied to that cell. Liquid crystal layer 102 is supported by glass layers 112.

LCD 100 generates different colors by using a monochrome light backlight 108 with color filter 110. To achieve different colors, each LCD pixel includes three color filters 110 which cover three adjacent cells of liquid crystal layer 102, each cell being individually controlled. In this scheme two-thirds of the light making it though liquid crystal layer 102 is absorbed by color filter 110. The blue filter totally absorbs the incident green and red component, the green filter all the blue and red, and the red filter all the green and blue. Accordingly, backlight 108 must be power at a high intensity in order to produce video at a suitable brightness.

SUMMARY

An embodiment of the invention is directed to a display. The display comprises a backlight comprising different colored light sources, a transmissive display panel positioned adjacent to the backlight, and a light guide positioned between the backlight and the transmissive display. The light guide directs light from the different colored light sources onto the transmissive display to create an alternating array of colors.

Another embodiment of the invention is directed to a light guide positioned between a transmissive display and a backlight. The light guide comprises optical sheets positioned in alternating order to direct light from the different colored light sources, wherein the optical sheets are positioned in an alternating order to direct an alternating array of colors onto the transmissive display.

Another embodiment of the invention is directed to a display. The display comprises means for creating different colored light, means for transmitting selective amounts of the different colored light to generate video, and means for directing light the different colored light onto the transmitting means to create an alternating array of colors.

Additional embodiments will be set forth in part in the description which follows, and in part will be obvious from the description, or may be learned by practice of the invention. The embodiments will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate several embodiments and together with the description, serve to explain the principles of the invention.

DETAILED DESCRIPTION

A power efficient method would be to illuminate each sub-pixel or LC cell separately with a high efficiency red, green or blue light source, according to its position in the array. However, placing a separate color light source behind each sub-pixel is impractical. The backlight would have to include separate light sources for each sub-pixel.

According to embodiment of the invention, illumination of a display panel is achieved by routing the light generated by individual colored light source to a multitude of sub-pixels. A light guide is placed between the backlight and the display panel to route the light from the backlight to the display panel. The light guide directs the light from individual colored light sources and directs the light to different sub-pixels on the display panel.

By routing light from individual colored light sources, the number of light sources can be reduced. Accordingly, the power consumed by the display may also be reduced.

According to embodiments, the light guide includes stacked optical sheets. Alternating optical sheets of the light guide are illuminated by different colored light sources. The optical sheets direct the light to different parts of the display panel to create an alternating array of colors. The light guide is arranged such that each column of the alternating array of colors is aligned with sub-pixels of the display panel. Thus, each sub-pixel is illuminated by a different color. Three consecutive columns form a complete RGB pixel column.

According to embodiments, the display panel may also be formed on a surface of the light guide. As such, a thick glass is not needed to support the transmissive layer of the display panel. Additionally, by removing the thick glass, the parallax problem created by separating the color backlight form the LC cells with a thick glass sheet is removed.

According to embodiments, sensors may be placed between the light guide and backlight. The outputs of the lights sources change over time, which generate color shifts in the overall output of the pixels. Measuring the outputs of individual light sources enables the proper "gain" for each light source to be set in order to prevent the development of such color shifts.

According to embodiments, multiple light guides may be used in a display. The multiple light guides may be arranged to create an array of alternating colors on the display panel.

Reference will now be made in detail to embodiments of the invention, examples of which are illustrated in the accompanying drawings. Wherever possible, the same reference numbers will be used throughout the drawings to refer to the same or like parts.

Figure 1:
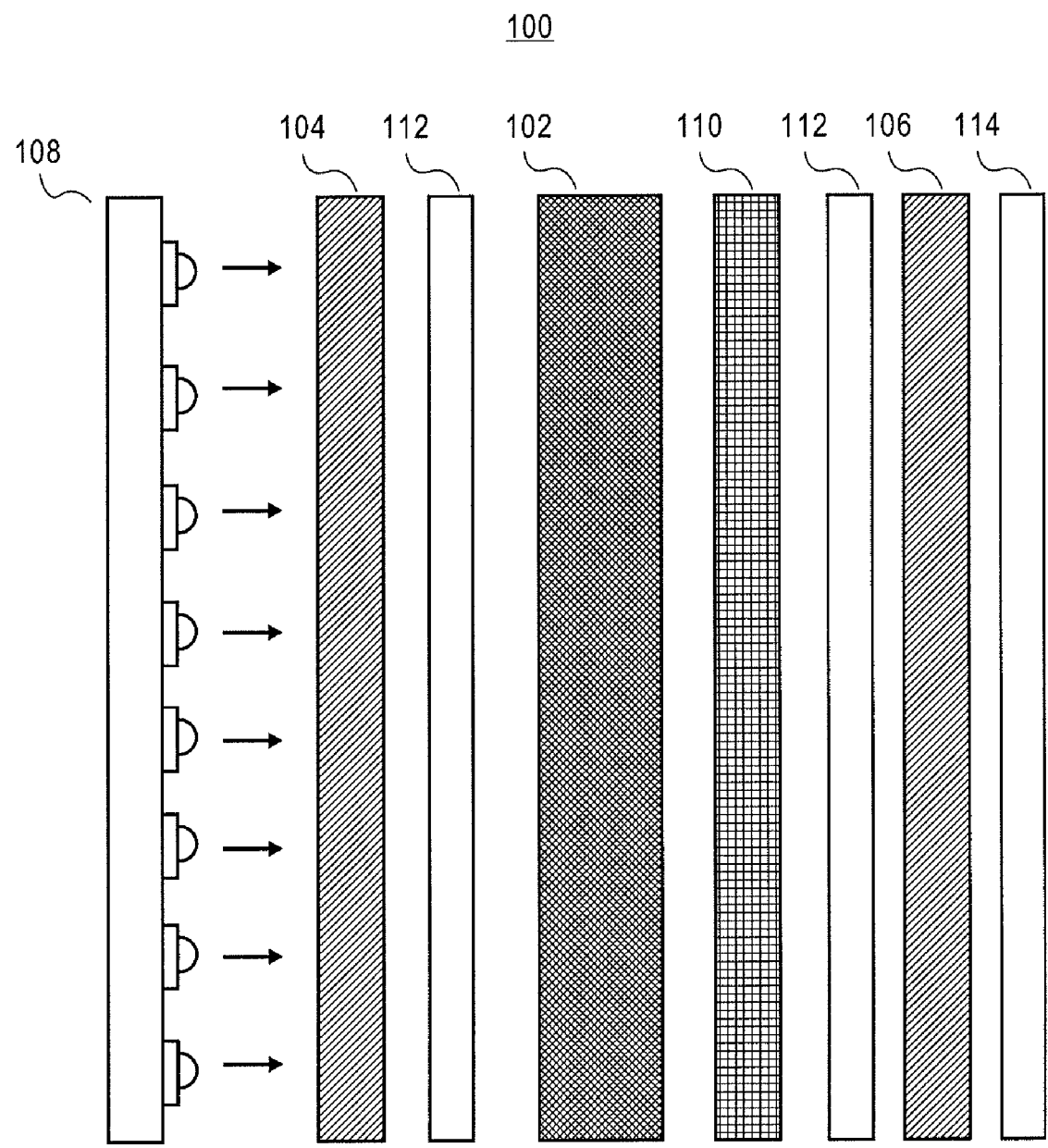
FIG. 1 is a diagram illustrating a conventional display.
Figure 2:
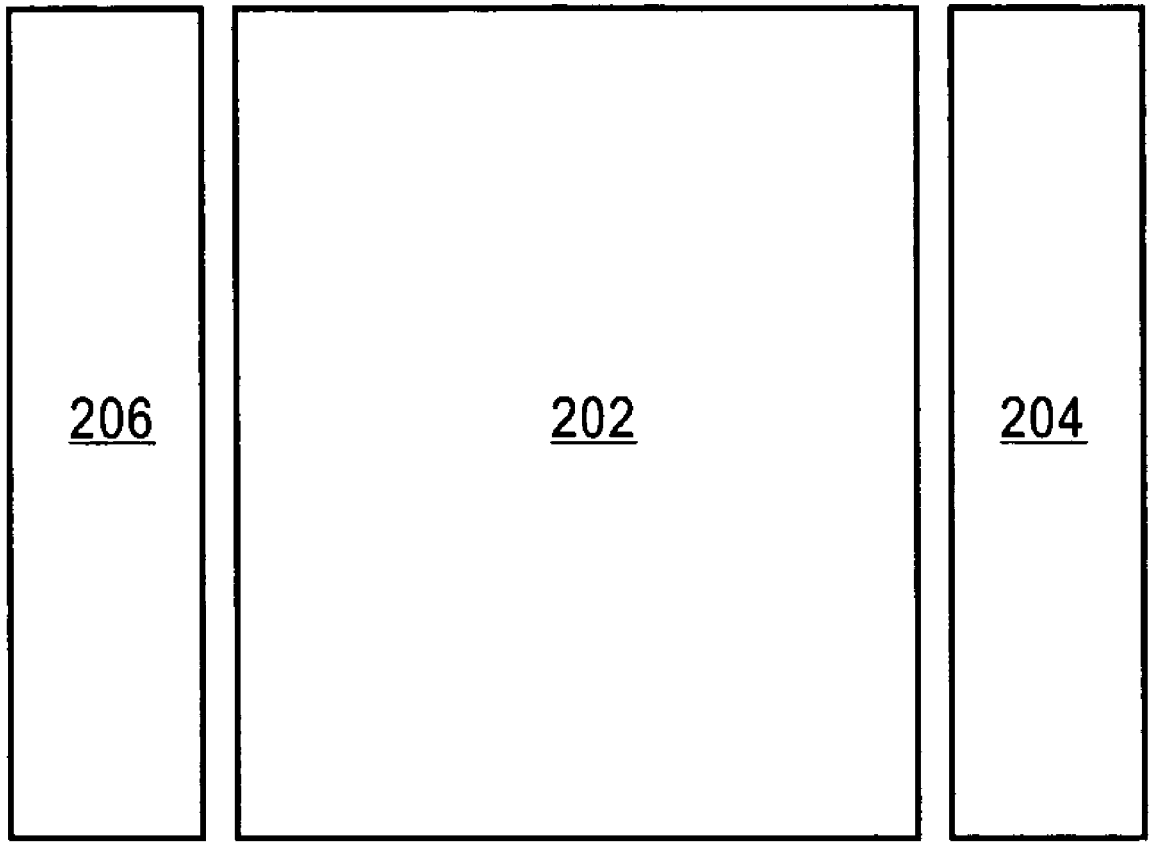
FIG. 2 is a diagram illustrating a display consistent with embodiment of the invention.

FIG. 2 illustrates a display 200 including a light guide 202 consistent with embodiments. It should be readily apparent to those of ordinary skill in the art that display 200 illustrated in FIG. 2 represents a generalized schematic illustration and that other components may be added or existing components may be removed or modified.

Display 200 includes light guide 202 positioned between backlight 204 and transmissive display panel 206. Light guide 202 directs light from the different colored light sources in backlight 204 onto display panel 206. Light guide 202 directs the light such that an alternating array of colored light is directed onto display panel 206. Light guide 202 includes multiple optical elements to direct light from backlight 204. As such, backlight 204 requires fewer light sources.

Light guide may be any type of optical material or combination of optical materials to direct light from backlight 204 onto display panel 206. The optical material of light guide is arranged such that light from the different colored light sources is directed onto display panel 206 in a specific area. Light guide directs the light onto display panel 206 so that the different cells of display panel 206 are illuminated with different colors. This allows display panel 206 to produce a wide range of colors in pixel.

For example, light guide 202 directs the light such that an alternating array of colored light is directed onto display panel 206. Display panel 206 is then arranged such that each cell of display panel 206 is aligned with one portion of the alternating array of colored light.

Backlight 204 may be any type of light source capable of producing multiple colored light sources. Display panel 206 may be any type of transmissive display panel capable of transmitting light at various brightness for different cells of display panel 206.

Figure 3:
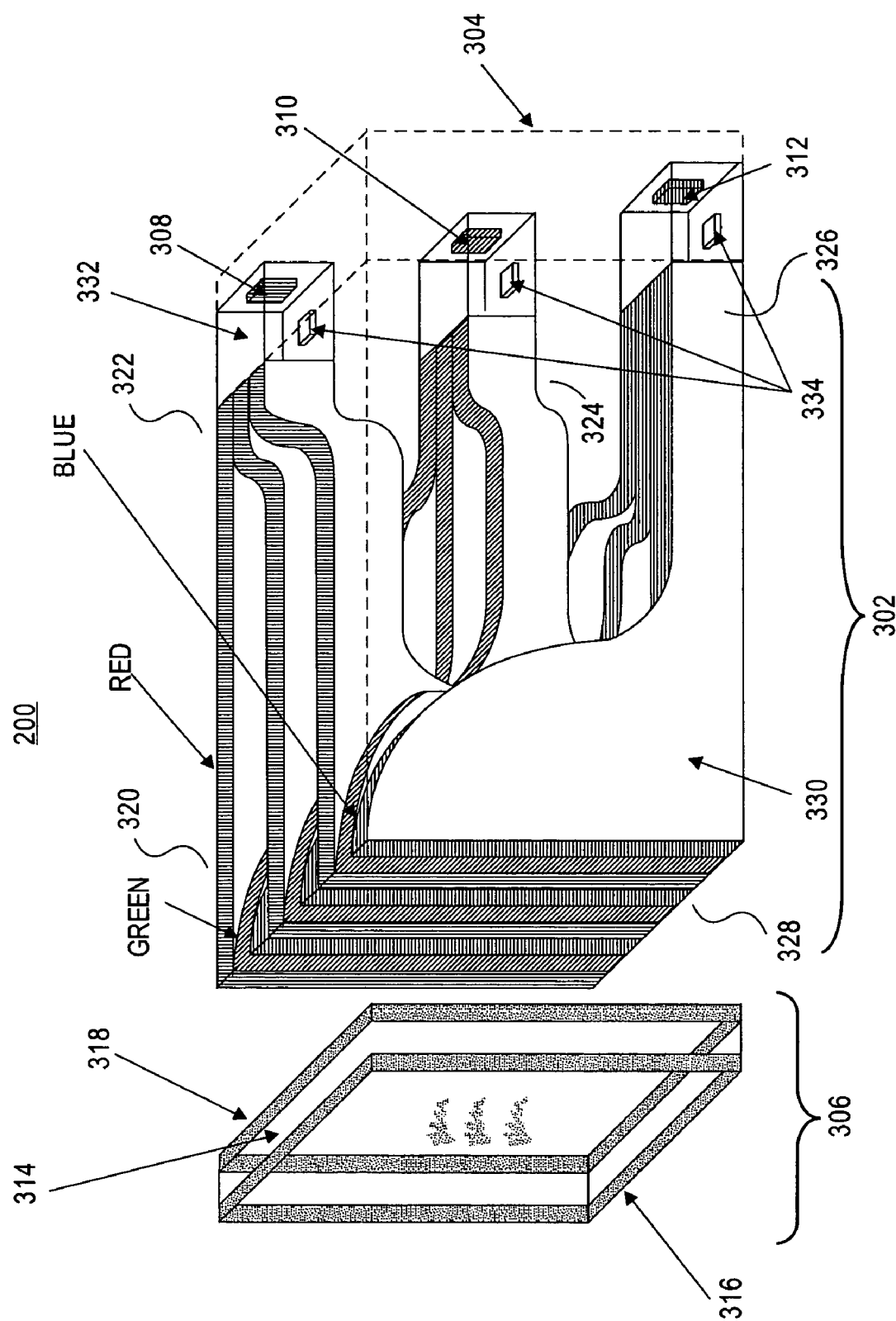
FIG. 3 is a diagram illustrating a side view of a display consistent with embodiments of the invention.

FIG. 3 is a diagram illustrating an example of display 200 including a light guide 302. It should be readily apparent to those of ordinary skill in the art that display 200 illustrated in FIG. 3 represents a generalized schematic illustration and that other components may be added or existing components may be removed or modified. Display 300 includes a backlight 304 and a transmissive display panel 306. Light guide 302 is positioned between backlight 304 and transmissive display panel 306.

As shown in FIG. 3, backlight 304 may be a LED backlight. Backlight 304 includes three light sources 308, 310, and 312. For example, light sources 308, 310, and 312 may be light emitting diodes (LEDs). Each light source 308, 310, and 312 may be a different color. For example, light source 308 may emit red light. Light source 310 may emit green light. Light source 312 may emit blue light. One skilled in the art will realize that the type, color, and number of light sources in backlight 304 are exemplary. Light sources 308, 310, and 31 may be any type of light source to produce different colors. Further, backlight 304 may include additional light sources. Further, light sources of backlight 304 may be arranged in any configuration.

As illustrated in FIG. 3, display panel 306 may include a liquid crystal panel. Display panel 306 may include a liquid crystal (LC) layer 314. LC layer 314 may be sandwiched between a front plate 316 and a back plate 318. Front plate 316 or back plate 318 may be constructed of any type of transparent or semi-transparent material, such as glass. Further, front plate 316 or back plate 318 may include a polarizer and circuit pattern, such as Indium Tin Oxide (ITO) pattern. LC layer 314 would include LC cells. For example, a pixel for display 300 would be composed of three adjacent LC cells in display panel 306, each cell representing a color. One skilled in the art will realize that display panel 306 is exemplary and that display panel may be any type of transmissive display panel capable of transmitting light at various brightness for different sub-areas of display panel 306.

Light guide 302 comprises overlaying optical sheets 320. Optical sheets 320 are tapered in three non-overlapping directions. The tapered end of optical sheets 320 is positioned next to backlight 204. Alternating optical sheets 320 are bundled into three bundles, 322, 324, and 326 at the tapered end. Each, each bundle is illuminated with a separate color light source 308, 310, or 312.

Specifically, light source 308 illuminates bundle 322. Light source 310 illuminates bundle 324. Light source 312 illuminates bundle 326. Since each bundle is one illuminated with one color light source, optical sheets 320 in each bundle transmits only that color emitted from light sources 308, 310, and 312. Since alternating optical sheets 320 are illuminated with different colors, an array of alternating colors is created on output edges 328 of optical sheets 320. Specifically, the array consists of alternating red, green and blue columns.

Output edges 328 of optical sheets 320 are aligned with the LC cells of display panel 306. As such, each column of sub-pixels is illuminated by a common color light. Three consecutive columns form complete RGB pixel column.

Light guide 320 may be separate from display 200. As such, light guide may be removed and added to display 200. Additionally, light guide 320 may be an integral part of display 200.

For a good coupling between backlight 304 and light guide 302, light guide 302 may be coupled to backlight 304 with an optical material 332 such as a high index of refraction optical gel disposed between light guide 302 and backlight 304. One skilled in the art will realize that the use of optical gel is exemplary. Any material may be used between light guide 302 and backlight 304 to improve coupling and improve light transmission.

Figure 4:
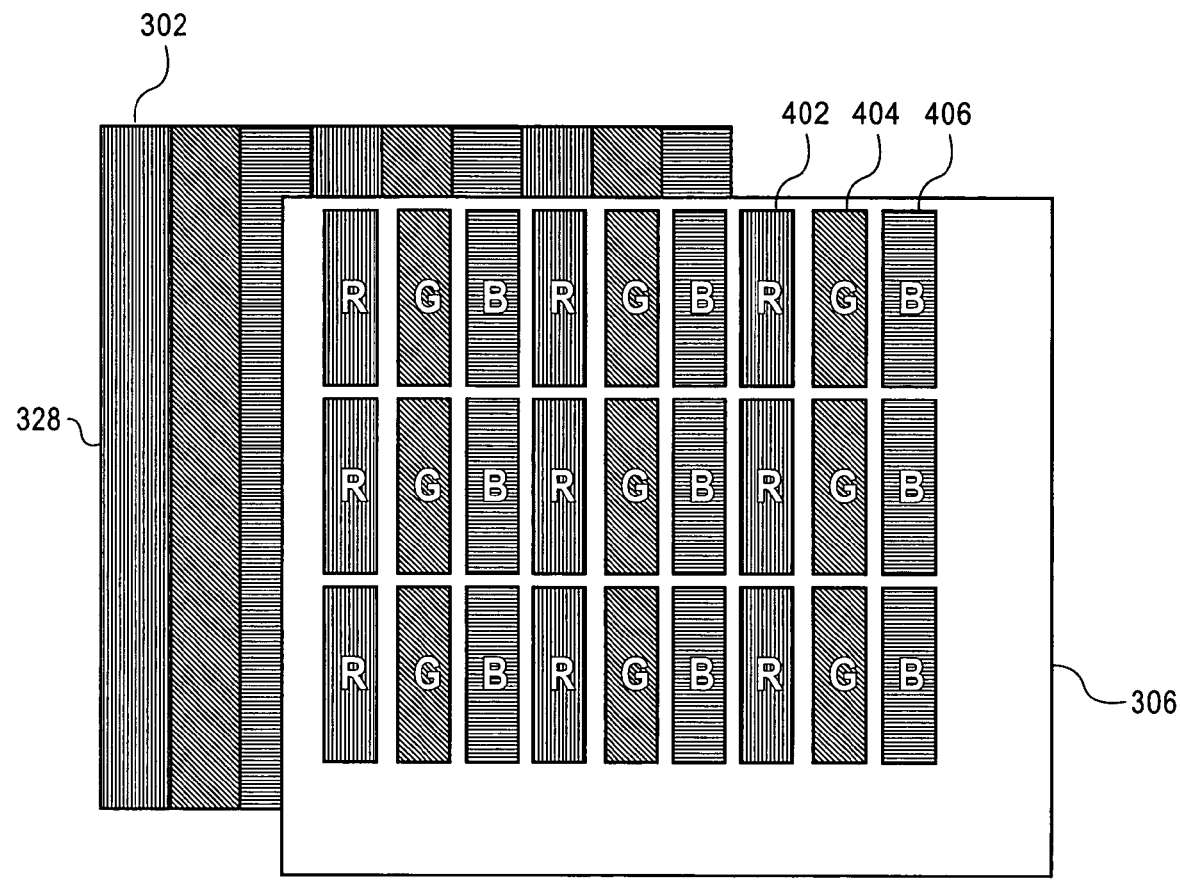
FIG. 4 is a diagram illustrating a front view of a display consistent with embodiments of the invention.

FIG. 4 is a diagram illustrating the arrangement of output edges 328 of optical sheets 320 of light guide 302 with display panel 306. As illustrated in FIG. 4, output edges 328 of optical sheets 320 are aligned with the LC cells of display panel 306. As such, each column of sub-pixels is illuminated by a common color light, and three consecutive columns form a complete RGB pixel column. For example, output edges 328 of alternating optical sheet are arranged with LC cells 402, 404, and 406. Since alternating optical sheets 320 transmit different colors, LC cells 402, 404, and 406 are illuminated with a different colors red, green, and blue, respective. LC cells 402, 404, and 406 form a complete RGB pixel. Since the optical sheets overlay multiple LC cells, an array of complete RGB pixels is formed.

Figure 5:
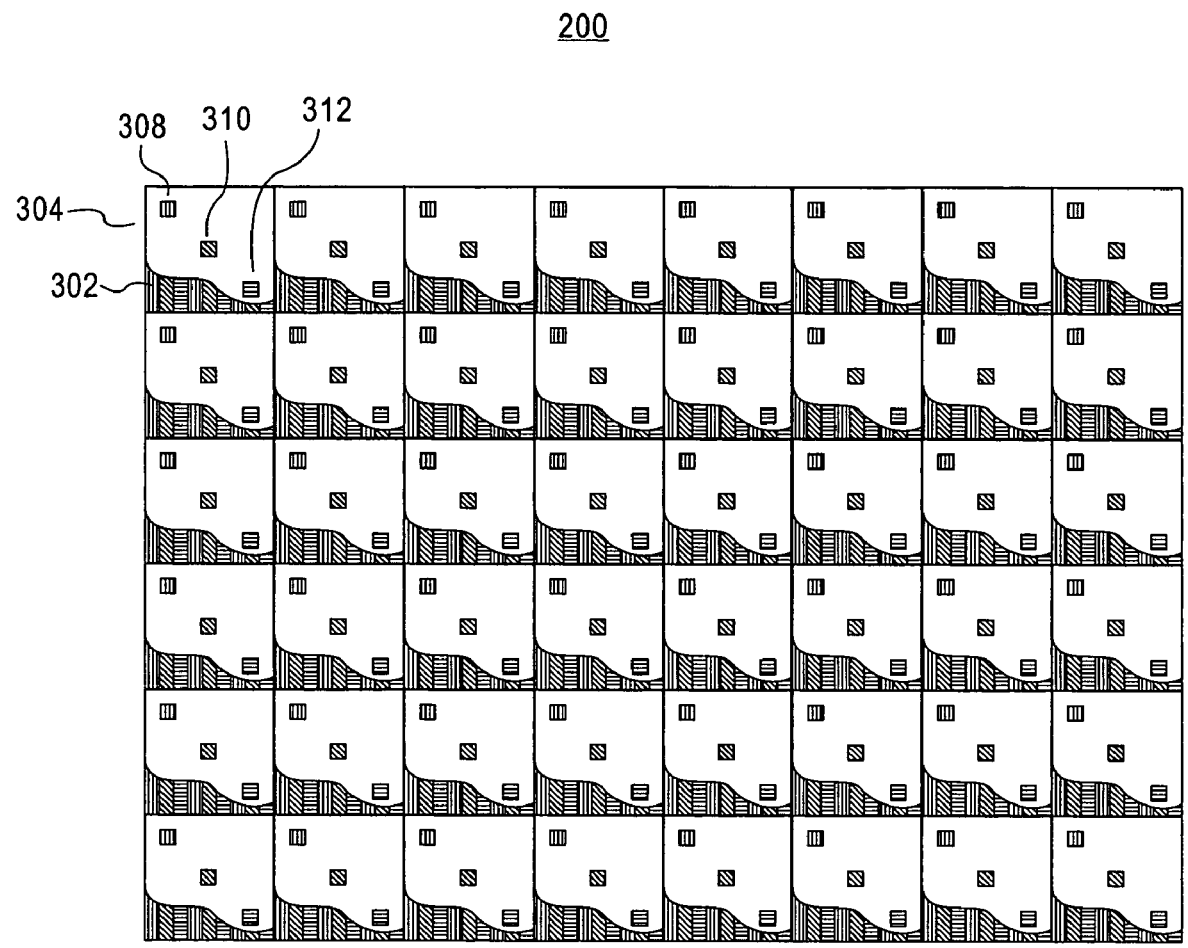
FIG. 5 is a diagram illustrating another front view of a display consistent with embodiments of the invention.

As illustrated in FIG. 3, display 200 may be composed of a single backlight 304 and light guide 302. Alternatively, display 200 may be composed of multiple modules which include backlights 304 and light guides 302. FIG. 5 illustrates a display 200 with includes multiple backlights 304 and light guides 302. As illustrated in FIG. 5, each module includes a backlight with LEDs 308, 310, and 312. Each module also includes a light guide 302. Each module may be arranged as illustrated in FIG. 3. As illustrated in FIG. 5, each module may be arranged in columns and row to create alternating red, green and blue columns.

As illustrated in FIG. 3, optical sheets 320 are tapered in one dimension to allow optical sheets 320 to be bundled and illuminated by a light source. Optical sheets 320 may also be tapered in other dimensions. For example, optical sheets 320 may increase in thickness ("flared") towards output edge 328.

Optical sheets 320 also include a reflective material 330 on the sides of walls of optical sheets 320. Reflective material 330 reflects light from light sources 308, 310, and 312 towards the output edges of optical sheets 320. Reflective material 330 may be any type of material that completely or partially reflects light of any color.

Output edges 328 of optical sheets 320 may be completely transmissive. Additionally, output edges 328 may partially disperse light directed by optical sheets 320. For example, output edges 328 may partially reflect light directed by optical sheets 320 away from display panel 306.

Output edges 328 may be formed of a material that partially disperses light directed by optical sheets 320, or a dispersive material may be attached to output edges 328. For example, output edges 328 may be formed of a material that partially reflects light directed by optical sheets 320, or a reflective material may be attached to output edges 328.

Output edges 328 may be partially dispersive in particular local areas of output edges 328. Additionally, output edges 328 may be globally dispersive across the entire area of output edges 328. The local reflection and dispersion allows the light directed by optical sheets 320 to be more uniformly distributed along output edges 328. One skilled in the art will realize that the above configuration of output edges 328 is exemplary and that output edges 328 may be have any transmissive or dispersive configuration.

Output edge 328 of optical sheets edge may also be "lensed" or "roughened" to enhance a more uniform output light distribution. FIGS. 6A-6D are side views of output edge 328 illustrating several exemplary configuration of output edge 328 consistent with embodiments. As shown in FIGS. 6A-6D, output edge 328 may be formed in various configurations to distribute the light from optical sheets 320 more uniformly. One skilled in the art will realize that FIG. 6A-6D are exemplary configuration of output edge 328 and that output edge 328 may be formed in any configuration to distribute light transmitted by optical sheets 320.

Figure 6A:
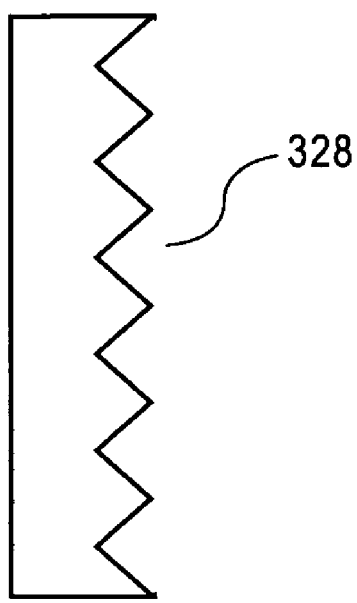
FIGS. 6A-D are diagrams illustrating side views of edges of a light guide.

FIG. 6A is a side view illustrating an exemplary configuration in which output edge 328 of optical sheets 320 are formed in an irregular or "jagged" pattern. As light directed by optical sheets 320 strikes the jagged pattern, the light is more uniformly distributed as it is outputted from output edge 328. Output edge 328 may be formed in the configuration as illustrated in FIG. 6A when optical sheets 320 are formed. Likewise, output edge 328 may be formed uniform and roughed after formation by chemical or mechanical methods.

Figure 6B:
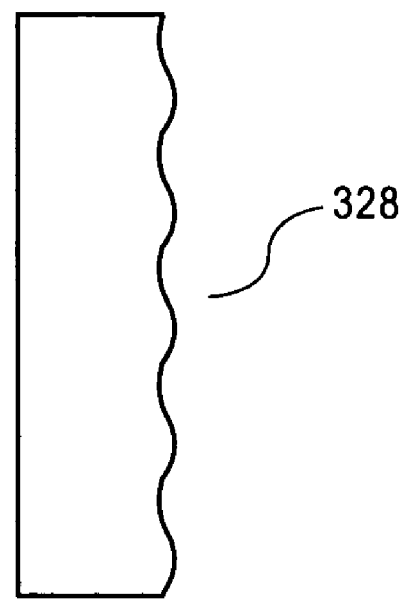

FIG. 6B is a side view illustrating an exemplary configuration in which output edge 328 of optical sheets 320 are formed in an irregular or "wavy" pattern. As light directed by optical sheets 320 strikes the irregular pattern, the light is more uniformly distributed as it is outputted from output edge 328. Output edge 328 may be formed in the configuration as illustrated in FIG. 6B when optical sheets 320 are formed. Likewise, output edge 328 may be formed uniform and roughed after formation by chemical or mechanical methods.

Figure 6C:
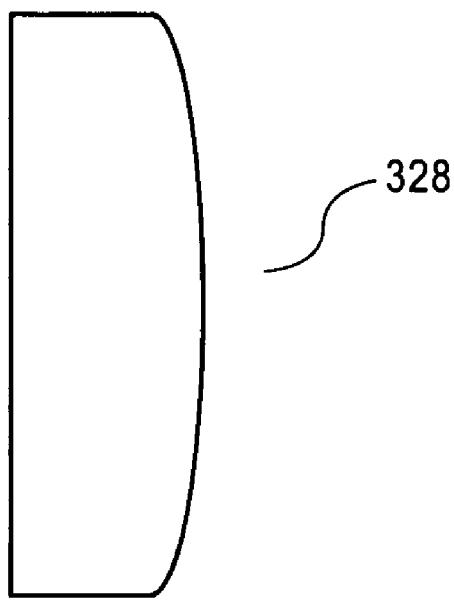

FIG. 6C is a side view illustrating an exemplary configuration in which output edge 328 of optical sheets 320 are formed in a convex lens configuration. As light directed by optical sheets 320 strikes the convex pattern, the light is more uniformly distributed as it is outputted from output edge 328. Output edge 328 may be formed in the configuration as illustrated in FIG. 6C when optical sheets 320 are formed. Likewise, output edge 328 may be formed uniform and shaped after formation by chemical or mechanical methods.

Figure 6D:
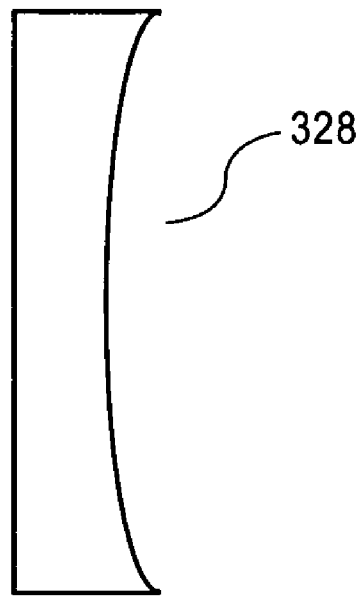

FIG. 6D is a side view illustrating an exemplary configuration in which output edge 328 of optical sheets 320 are formed in a concave lens configuration. As light directed by optical sheets 320 strikes the concave pattern, the light is more uniformly distributed as it is outputted from output edge 328. Output edge 328 may be formed in the configuration as illustrated in FIG. 6D when optical sheets 320 are formed. Likewise, output edge 328 may be formed uniform and shaped after formation by chemical or mechanical methods.

Output edges 328 of optical sheets 320 may be formed of a solid material. When the output edges are formed of a solid material, output edges 328 of optical sheets 320 may be fused together to form a solid surface. When output edges 328 are fused, display panel 306 may be formed on output edges 328. This approach reduces the need for a thick glass support for the LC layer. In such a configuration, display 306 may include a thin sheet of glass 316. For example, glass sheet 316 may be formed as this as 0.1 mm. Glass sheet 316 may include ITO patterns. Glass sheet 316 may include a substrate for the TFT circuits so that LC layer may be flipped with active circuits directed toward backlight 304. One skilled in the art will realize that glass sheet 316 is exemplary and that glass sheet 316 may be formed of any suitable material and formed of any suitable thickness.

Sensors 334 may also be included between light guide 302 and backlight 304. Sensors 334 may measure changes in light sources 308, 310, and 312 which may generate color shifts in the overall output of the pixels. Sensor 334 may also measure other light parameters such as color and intensity. Sensor 334 may transmit changes in light sources 308, 310, and 312. In response, backlight 304 may set the proper "gain" for each light source as to prevent color shifts. One skilled in the art will realize that sensor 334 may be any type of sensor in order to measure the light emitted for light sources 308, 312, and 312.

Light guide 302 may also include additional neutral optical sheets. These neutral optical sheets may be positioned so that the neutral optical sheets do not transmit light from the light sources of backlight 304. The neutral optical sheets may be placed in between optical sheets 320. For example, the neutral optical sheet may be positioned between each of the red, blue and green transmitting optical sheets 320. Additional, the neutral optical sheets may be positioned between adjacent groups of red, green and blue optical sheets 320.

Other embodiments will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A display, comprising:
   a backlight comprising different colored light sources;
   a transmissive display panel positioned adjacent to the backlight; and
   a light guide positioned between the backlight and the transmissive display,
   wherein the light guide directs light from the different colored light sources onto the transmissive display to create an alternating array of colors, and wherein the light guide includes optical sheets positioned in alternating order to direct the alternating array of colors onto the transmissive display.

2. The display of claim 1, the light guide further comprising: neutral optical sheets positioned between the optical sheets, wherein the neutral optical sheets do not direct light from the light sources.

3. The display of claim 1, wherein the optical sheets comprise: first edges positioned adjacent to the backlight, wherein the first edges are tapered.

4. The display of claim 1, wherein the optical sheets further comprise: a reflective surface to direct the light from the different colored light sources.

5. The display of claim 1, wherein a surface of the light guide positioned adjacent to the transmissive display is configured to evenly distribute light from the light sources along the surface of the light guide.

6. The display of claim 5, wherein the surface of the light guide is roughed to evenly distribute light along the surface.

7. The display of claim 5, wherein the surface of the light guide is lensed to evenly distribute light along the surface.

8. The display of claim 1, wherein a surface of the light guide partially disperses and partially reflect light from the light sources.

9. The display of claim 1, wherein the transmissive display panel is formed on a surface of the light guide.

10. The display of claim 1, further comprising: a light sensor positioned adjacent to the light sources for detecting light from the light sources.

11. The display of claim 1, further comprising:
multiple backlights; and
multiple light guides positioned between the multiple backlights and the transmissive display.

12. A light guide positioned between a transmissive display and a backlight having different colored light sources, comprising:
optical sheets positioned in alternating order to direct light from the different colored light sources, wherein the optical sheets are positioned in an alternating order to direct an alternating array of colors onto the transmissive display.

13. The light guide of claim 12, further comprising: first edges positioned adjacent to the backlight, wherein the first edges are tapered.

14. The light guide of claim 12, further comprising: a reflective surface to direct the light from the different colored light sources.

15. The light guide of claim 12, further comprising: second edges positioned adjacent to the transmissive display, wherein the second edges are configured to evenly distribute light from the light sources along the surface of the light guide.

16. The light guide of claim 15, wherein the second edges are roughed to evenly distribute light along the surface.

17. The light guide of claim 15, wherein the second edges of the light guide are lensed to evenly distribute light along the surface.

18. The light guide of claim 12, further comprising second edges positioned adjacent to the transmissive display, wherein the second edges partially disperse and partially reflect light from the light sources.

19. The light guide of claim 18, wherein the transmissive display is formed on the second edges of the light guide.

20. The light guide of claim 12, further comprising: neutral optical sheets positioned between the optical sheets, wherein the neutral optical sheets do not direct light from the light sources.

21. A display comprising:
means for creating different colored light;
means for transmitting selective amounts of the different colored light to generate video; and
means for directing an alternating array of colors from the different colored light onto the transmitting means, the directing means comprising optical sheets positioned in an alternating order to direct the alternating array of colors onto the transmitting means.

* * * * *